United States Patent
Zhang et al.

(10) Patent No.: US 11,272,272 B2
(45) Date of Patent: Mar. 8, 2022

(54) METHOD AND APPARATUS FOR OPENING QUIET WINDOW, AND REGISTRATION METHOD, APPARATUS AND SYSTEM

(71) Applicant: ZTE Corporation, Shenzhen (CN)

(72) Inventors: Weiliang Zhang, Shenzhen (CN); Liquan Yuan, Shenzhen (CN)

(73) Assignee: XI'AN ZHONGXING NEW SOFTWARE CO., LTD., Shaanxi (CN)

( * ) Notice: Subject to any disclaimer, the term of this patent is extended or adjusted under 35 U.S.C. 154(b) by 0 days.

(21) Appl. No.: 17/049,598

(22) PCT Filed: Mar. 7, 2019

(86) PCT No.: PCT/CN2019/077353
§ 371 (c)(1),
(2) Date: Oct. 22, 2020

(87) PCT Pub. No.: WO2019/205823
PCT Pub. Date: Oct. 31, 2019

(65) Prior Publication Data
US 2021/0243510 A1    Aug. 5, 2021

(30) Foreign Application Priority Data
Apr. 26, 2018    (CN) .......................... 201810385960.2

(51) Int. Cl.
*H04Q 11/00*    (2006.01)
(52) U.S. Cl.
CPC . *H04Q 11/0067* (2013.01); *H04Q 2011/0079* (2013.01)

(58) Field of Classification Search
CPC .. H04Q 11/0067; H04B 10/27; H04B 10/272; H04B 10/40
See application file for complete search history.

(56) References Cited

U.S. PATENT DOCUMENTS

| | | | |
|---|---|---|---|
| 9,048,946 B1 | 6/2015 | Roberts | |
| 2009/0238558 A1 | 9/2009 | Katayama | |
| 2017/0279527 A1 | 9/2017 | Kim | |
| 2018/0145757 A1* | 5/2018 | Weeber | ............... H04J 14/0227 |
| 2019/0174212 A1* | 6/2019 | Detwiler | ............... H04L 1/0009 |

(Continued)

FOREIGN PATENT DOCUMENTS

| | | |
|---|---|---|
| CN | 101567799 A | 10/2009 |
| CN | 102075820 A | 5/2011 |

(Continued)

OTHER PUBLICATIONS

International Search Report for corresponding application PCT/CN2019/077353 filed Mar. 7, 2019; dated Jun. 3, 2019.

(Continued)

*Primary Examiner* — Dzung D Tran
(74) *Attorney, Agent, or Firm* — Cantor Colburn LLP

(57) ABSTRACT

Embodiments of the present application provide a method and apparatus for opening a quiet window, and a registration method, apparatus and system. The method for opening a quiet window includes that: a first quiet window is opened when it is determined that the first quiet window needs to be opened, wherein the first quiet window is used for Optical Network Unit (ONU) discovery.

19 Claims, 5 Drawing Sheets

(56) References Cited

U.S. PATENT DOCUMENTS

2019/0327541 A1* 10/2019 Zhang .................... H04Q 11/00
2019/0386743 A1* 12/2019 Yin ...................... H04J 14/0242

FOREIGN PATENT DOCUMENTS

| CN | 102082976 A | 6/2011 |
| CN | 106878836 A | 6/2017 |
| CN | 106937184 A | 7/2017 |
| CN | 107395315 A | 11/2017 |
| EP | 2448152 A1 | 5/2012 |
| EP | 2615747 A2 | 7/2013 |

OTHER PUBLICATIONS

Draft Recommendation ITU-T G.987.3 (ex G.xgpon.3), 10-Gigabit-capable passive optical networks (XG-PON): Transmission convergence (TC) sepcifications; siepon_1010_LS225_SG15_incoming_attach_G98., vol. 802.1, Oct. 18, 2010, pp. 1-151, XP017737870.
European Office Action for corresponding application 19792791; Report dated May 27, 2021.

* cited by examiner

METHOD AND APPARATUS FOR OPENING QUIET WINDOW, AND REGISTRATION METHOD, APPARATUS AND SYSTEM

CROSS-REFERENCE TO RELATED APPLICATIONS

The present application is based upon and claims priority to Chinese Patent Application No. 201810385960.2, filed on Apr. 26, 2018, the entire contents of which are incorporated herein by reference.

TECHNICAL FIELD

Embodiments of the present application relate, but are not limited, to a Passive Optical Network (PON) technology, in particular to a method and apparatus for opening quiet window, and a registration method, apparatus and system.

BACKGROUND

FIG. 1 is a schematic diagram of the architecture of a PON. As shown in FIG. 1, a channel between an Optical Line Terminal (OLT) and an Optical Network Unit (ONU) is used to transmit both data and management information. That is, the OLT and the ONU communicate through one channel. With the development of mobile networks, the PON has gradually become one of the bearing technologies for mobile fronthaul, mobile backhaul, sensor network and in-vehicle network. In an application process, these network services have a strict requirement on transmission delays of mobile networks and even the bearer PON.

The transmission delays in the PON include an optical transmission delay, a delay caused by opening a quiet window and a bandwidth allocation delay.

The optical transmission delay is related to the length of an optical fiber, the transmission time of a 20 kilometers (km) optical fiber is about 100 microns (μs).

In a transmission process, an upstream service delay and even packet loss may occasionally occur.

SUMMARY

The embodiments of the present application provide a method and apparatus for opening a quiet window, and a registration method, apparatus and system, which can reduce the impact of a quiet window on a data transmission delay and thus reduce a transmission delay of a PON system.

The embodiments of the present application provide a method for opening a quiet window, which includes the following operation.

A first quiet window is opened when it is determined that the first quiet window needs to be opened.

Herein, the first quiet window is used for ONU discovery.

In the embodiments of the present application, the method may further include the following operation.

Opening the first quiet window is stopped when it is determined that the first quiet window does not need to be opened.

In the embodiments of the present application, the method may further include the following operation.

A second quiet window is opened when it is determined that the second quiet window needs to be opened.

Herein, the second quiet window is used for ONU ranging, and the second quiet window is shorter than the first quiet window.

In the embodiments of the present application, the second quiet window centers on an estimated moment of arrival of a ranging response.

The embodiments of the present application provide an apparatus for opening a quiet window, which includes an opening module.

The opening module is configured to open, when it is determined that a first quiet window needs to be opened, the first quiet window.

Herein, the first quiet window is used for ONU discovery.

The embodiments of the present application provide an apparatus for opening a quiet window, which includes a processor and a computer-readable storage medium. The computer-readable storage medium stores an instruction. When executed by the processor, the instruction implements the above method for opening the quiet window.

The embodiments of the present application provide a computer-readable storage medium, which stores a computer program. When executed by a processor, the computer program implements operations of the above method for opening the quiet window.

The embodiments of the present application provide a registration method, which includes the following operations.

When it is determined that a first quiet window needs to be opened, the first quiet window is opened and a discovery request is broadcast. Herein, the first quiet window is used for ONU discovery.

A discovery response sent by an ONU is detected, a second quiet window is opened, and a ranging request is sent to the ONU. Herein, the second quiet window is used for ONU ranging.

A ranging response is received, and a ranging result is calculated.

The embodiments of the present application provide a registration apparatus, which includes a discovering module and a ranging module.

The discovering module is configured to, when it is determined that a first quiet window needs to be opened, open the first quiet window, broadcast a discovery request, and detect identity information sent by an ONU. Herein, the first quiet window is used for ONU discovery.

The ranging module is configured to open a second quiet window, send a ranging request to the ONU, receive a ranging response, and calculate a ranging result. Herein, the second quiet window is used for ONU ranging.

The embodiments of the present application provide a registration apparatus, which includes a processor and a computer-readable storage medium. The computer-readable storage medium stores an instruction. When executed by the processor, the instruction implements the above registration method.

The embodiments of the present application provide a computer-readable storage medium, which stores a computer program. When executed by a processor, the computer program implements operations of the above registration method.

The embodiments of the present application provide a registration method, which includes the following operations.

Any of the followings is stored:
a corresponding relationship between identity information of an ONU and a bandwidth; a corresponding relationship between the identity information of the ONU and a ranging result; and a corresponding relationship among the identity information of the ONU, the ranging result and the bandwidth.

The corresponding relationship is sent by broadcast or sent to the ONU.

In the embodiments of the present application, the method may further include the following operations.

A second quiet window is opened, and a ranging request is sent to the ONU. Herein, the second quiet window is used for ONU ranging.

A ranging response is received, and a ranging result is calculated.

In the embodiments of the present application, the method may further include the following operation.

Information sent by the ONU at the bandwidth is received.

The embodiments of the present application provide a registration method, which includes the following operations.

Any of the followings is monitored: a corresponding relationship among identity information, a ranging result and a bandwidth; a corresponding relationship between the identity information and the ranging result; and a corresponding relationship between the identity information and the bandwidth.

Upon finding that local identity information is the same as the identity information in the corresponding relationship, at least one of the followings is performed:
obtaining the ranging result in the corresponding relationship, and applying the ranging result locally; and
obtaining the bandwidth in the corresponding relationship, and sending information in the bandwidth.

The embodiments of the present application provide a registration apparatus, which includes a storing module and a sending module.

The storing module is configured to store any of the followings: a corresponding relationship between identity information of an ONU and a bandwidth; a corresponding relationship between the identity information of the ONU and a ranging result; and a corresponding relationship among the identity information of the ONU, the ranging result and the bandwidth.

The sending module is configured to send the corresponding relationship by broadcast, or send the corresponding relationship to the ONU.

The embodiments of the present application provide a registration apparatus, which includes a monitoring module and at least one of the followings: an applying module and a sending module.

The monitoring module is configured to monitor any of the followings: a corresponding relationship among identity information, a ranging result and a bandwidth; a corresponding relationship between the identity information and the ranging result; and a corresponding relationship between the identity information and the bandwidth.

The applying module is configured to apply the ranging result locally upon finding that local identity information is the same as the identity information in the corresponding relationship.

The sending module is configured to send information in the bandwidth upon finding that local identity information is the same as the identity information in the corresponding relationship.

The embodiments of the present application provide a registration apparatus, which includes a processor and a computer-readable storage medium. The computer-readable storage medium stores an instruction. When executed by the processor, the instruction implements the above registration method.

The embodiments of the present application provide a computer-readable storage medium, which stores a computer program. When executed by a processor, the computer program implements operations of the above registration method.

The embodiments of the present application include that: a first quiet window is opened when it is determined that the first quiet window needs to be opened. Herein, the first quiet window is used for ONU discovery. According to the embodiments of the present application, the first quiet window is opened only when it is determined that the first quiet window needs to be opened, rather than periodically opening the first quiet window, such that the efficiency of the first quiet window is improved and the impact of the first quiet window on the data transmission delay is reduced, thereby reducing the transmission delay of the PON system.

In an exemplary embodiment, a second quiet window is opened when it is determined that the second quiet window needs to be opened. Herein, the second quiet window is used for ONU ranging, and the second quiet window is shorter than the first quiet window.

A distance between an OLT and an ONU may be estimated during ONU discovery. For example, during the ONU discovery, the OLT sends a discovery request to the ONU and records the time T1 when the discovery request is sent; the ONU receives the discovery request and sends to the OLT a discovery response which carries a time difference T (or related information) between receiving the discovery request and sending the discovery response; and the OLT receives the discovery response and records the time T2, calculates the round trip time (T2−T1−T) between the OLT and the ONU, and estimates, according to the propagation rate of light v, the distance D between the OLT and the ONU to be v(T2−T1−T)/2. Based on the above, the OLT may estimate the arrival time of the ranging response of the ONU. For example, if the time when the OLT sends the ranging request is t1 and the OLT predicts that the time required by the ONU to receive the ranging request and send the ranging response is t, the time when the ranging response sent by the ONU reaches the OLT is about (t1+T2−T1−T+t), so the quiet window opened for ranging may be (t1+T2−T1−T+t−Δt,t1+T2−T1−T+t+Δt), which is smaller than the quiet window opened for discovering the ONU and brings a smaller delay to the ONU working normally, thereby reducing the transmission delay of the PON system.

Other characteristics and advantages of the embodiments of the present application will be elaborated in the subsequent specification, and become in part apparent from the specification or become known through the implementation of the embodiments of the present application. The purposes and other advantages of the embodiments of the present application may be realized and obtained through the structures specified in the specification, the claims and the accompanying drawings.

DETAILED DESCRIPTION OF THE EMBODIMENTS

The embodiments of the present application are elaborated below in combination with the accompanying drawings.

These operations shown in the flowchart of the accompanying drawings can be executed in a computer system for executing a group of computer executable instructions. Moreover, although a logical sequence is shown in the flowchart, in some cases, the shown or described operations can be performed in a sequence different from that described herein.

Figure 1:
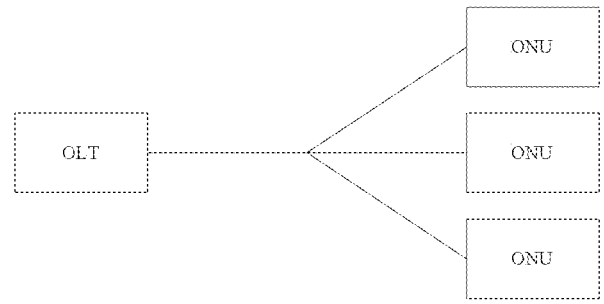
FIG. 1 is a schematic diagram of the architecture of a PON.
Figure 2:
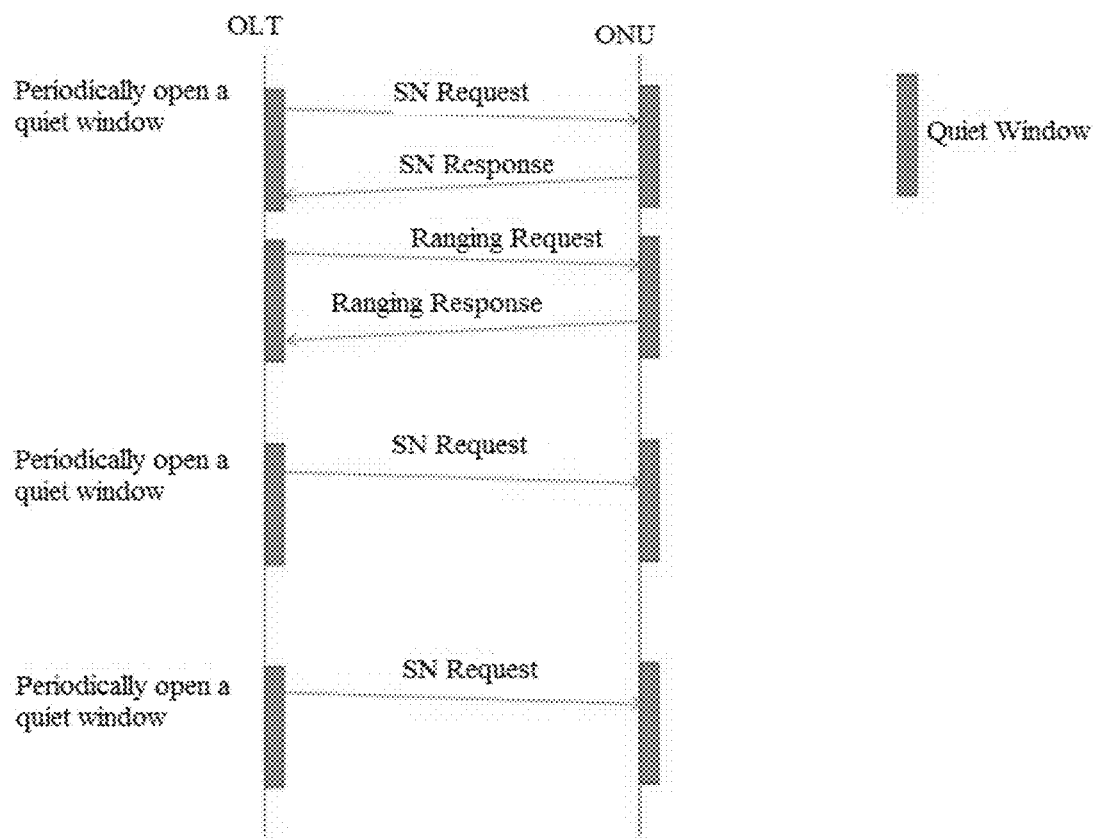
FIG. 2 is a schematic diagram of a method for opening a quiet window.

Opening a quiet window is used for ONU discovery and ONU ranging, and forms a part of the overhead for initializing a channel connection between an OLT and an ONU. During the opening of the quiet window, the ONU working normally cannot obtain an upstream bandwidth, cannot communicate with the OLT normally, and an upstream service will suffer from delay or even packet loss. As shown in FIG. 2, in order to discover an ONU at a maximum distance of 20 km from the OLT, it is necessary to open a quiet window of 200 μs. Moreover, in order to quickly discover the ONU, the OLT needs to open the quiet window periodically to discover the ONU, and the period is set according to practical applications. If it is expected that the OLT can discover the ONU to be registered at the second level, then the period should be at the second level, that is, the quiet window with a maximum of 200 μs needs to be opened every second.

ONUs to be registered and activated can send upstream signals in the quiet window, and other registered and activated ONUs working normally cannot obtain the upstream bandwidth and cannot communicate normally with the OLT in the quiet window, which results in that the ONU cannot send the upstream signal at the quiet window. As a result, if an ONU working normally has upstream data to be sent right at the beginning of the quiet window, the ONU has to wait for the end of the quiet window before the ONU can obtain a chance to send the upstream data. In this case, a delay of up to 200 μs or even packet loss may be caused to the upstream data sent by the ONU working normally.

Moreover, when the OLT performs ONU ranging, the quiet window also needs to be opened. In fact, the OLT may estimate a distance between the OLT and the ONU when the OLT discovers the ONU, that is, the OLT may estimate the arrival time of a ranging response of the ONU. Since the quiet window for ranging is specially designed for the ranging of the ONU, there is no need for multiple ONUs to compete in the quiet window, so the quiet window opened for the ONU ranging may be smaller than the quiet window opened for the ONU discovery, and thus the delay caused to the ONU working normally is also smaller.

Moreover, when the ONU comes back on-line after going off-line, the ONU needs to be re-registered, that is, the OLT needs to open the quiet window to discover the ONU and conduct ranging for the ONU.

Figure 3:
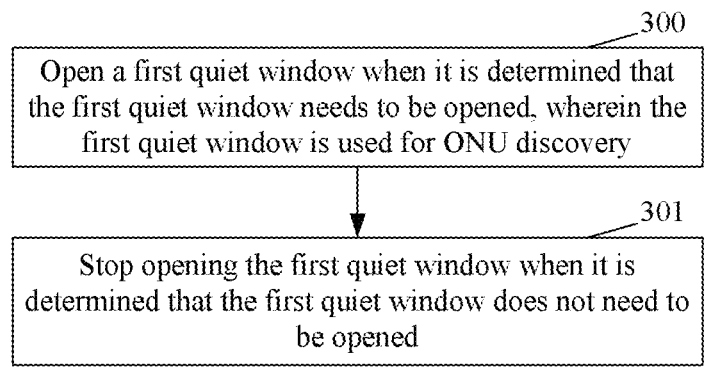
FIG. 3 is a flowchart of a method for opening a quiet window provided in an embodiment of the present application.

Referring to FIG. 3, an embodiment of the present application provides a method for opening a quiet window, which includes the following operation.

In operation 300, a first quiet window is opened when it is determined that the first quiet window needs to be opened. Herein, the first quiet window is used for ONU discovery.

In the embodiment of the present application, the first quiet window is opened only when it is determined that the first quiet window needs to be opened, rather than at fixed time. In some embodiments, before the operation 300, the method may further include an operation of determining whether the first quiet window needs to be opened. In the embodiment of the present application, the first quiet window may be opened periodically.

In the embodiments of the present application, any of the following methods (including a first method and a second method) may be used to determine that the first quiet window needs to be opened.

In the first method, it is determined that the first quiet window needs to be opened when there is an ONU needing to be registered.

In some embodiments, any of the following methods (1) to (3) may be used to determine that there is an ONU needing to be registered.

(1) According to a pre-configured amount of ONUs to be registered, it is determined that there is an ONU needing to be registered. For example, when the number of registered ONUs is less than the pre-configured amount of the ONUs to be registered, or when the pre-configured amount of the ONUs to be registered is greater than or equal to 1, it is determined that there is an ONU needing to be registered.

(2) According to pre-configured identity information of ONUs to be registered, it is determined that there is an ONU needing to be registered. For example, when there is an unregistered ONU in the ONUs corresponding to the pre-configured identity information, or when there is the pre-configured identity information, it is determined that there is an ONU needing to be registered.

(3) According to second notification information, it is determined that there is an ONU needing to be registered. That is, if the second notification information is received, it is determined that there is an ONU needing to be registered. The second notification information may be sent from a network management system.

In the second method, it is determined that the first quiet window needs to be opened according to first notification information. That is, if the first notification information is received, it is determined that the first quiet window needs to be opened. The first notification information may be sent from a network management system.

In another embodiment of the present application, the method may further include the following operation.

In operation 301, opening the first quiet window is stopped when it is determined that the first quiet window does not need to be opened.

The operation 301 includes, but is not limited to, the following contents:

if it is determined that the first quiet window does not need to be opened, the opening of the first quiet window is delayed before the first quiet window is opened, or the opening of the first quiet window is prematurely ended in the process of opening the first quiet window.

In the embodiments of the present application, any of the following methods (including a first method and a second method) may be used to determine that the first quiet window does not need to be opened.

In the first method, it is determined that registration for all ONUs to be registered has been completed.

In some embodiments, any of the following methods (1) to (4) may be used to determine that the registration for all the ONUs to be registered has been completed.

(1) According to a pre-configured amount of the ONUs to be registered, it is determined that the registration for all the ONUs to be registered has been completed. For example, when the number of the registered ONUs is equal to the pre-configured amount of the ONUs to be registered, or the number of the ONUs to be registered is 0, it is determined that the registration for all the ONUs to be registered has been completed.

(2) According to pre-configured identity information of the ONUs to be registered, it is determined that the registration for all the ONUs to be registered has been completed. For example, when all the ONUs corresponding to the pre-configured identity information of the ONUs to be registered have been registered, or there is no pre-configured identity information of the ONUs to be registered, it is determined that the registration for all the ONUs to be registered has been completed.

(3) When there is no ONU registered within a preset time, it is determined that the registration for all the ONUs to be registered has been completed.

(4) According to fourth notification information, it is determined that the registration for all the ONUs to be registered has been completed. That is, if the fourth notification information is received, it is determined that the registration for all the ONUs to be registered has been completed. The fourth notification information may be sent from a network management system.

In the second method, it is determined that the first quiet window does not need to be opened according to third notification information. That is, if the third notification information is received, it is determined that the first quiet window does not need to be opened. The third notification information may be sent from a network management system.

In another embodiment of the present application, the method may further include that: a second quiet window is opened when it is determined that the second quiet window needs to be opened.

Herein, the second quiet window is used for ONU ranging, and the second quiet window is shorter than the first quiet window.

That the second quiet window is shorter than the first quiet window means that the duration of the second quiet window is less than the duration of the first quiet window.

In some embodiments, the method may include the following operations.

The type of the quiet window needing to be opened is determined.

If it is determined that the first quiet window needs to be opened, the first quiet window is opened. If it is determined that the second quiet window needs to be opened, the second quiet window is opened.

In some other embodiments, if it is determined that the first quiet window and/or the second quiet window do/does not need to be opened, the corresponding quiet window(s) is/are not opened.

In the embodiments of the present application, the distance between the OLT and the ONU may be estimated during ONU discovery. For example, during the ONU discovery, the OLT sends a discovery request to the ONU and records the time T1 when the discovery request is sent; the ONU receives the discovery request and sends to the OLT a discovery response which carries a time difference T (or related information) between receiving the discovery request and sending the discovery response; and the OLT receives the discovery response and records the time T2, calculates the round trip time (T2−T1−T) between the OLT and the ONU, and estimates, according to the propagation rate of light v, the distance D between the OLT and the ONU to be v(T2−T1−T)/2. Based on the above, the OLT may estimate the arrival time of the ranging response of the ONU. For example, if the time when the OLT sends the ranging request is t1 and the OLT predicts that the time required by the ONU to receive the ranging request and send the ranging response is t, the time when the ranging response sent by the ONU reaches the OLT is about (t1+T2−T1−T+t), so the quiet window opened for ranging may be smaller than the quiet window opened for discovering the ONU, and thus brings a smaller delay to the ONU working normally, thereby reducing the transmission delay of a PON system.

For example, the second quiet window centers on an estimated moment of arrival of a ranging response, for example, the second quiet window may be (t1+T2−T1−T+t−Δt,t1+T2−T1−T+t+Δt).

Figure 4:
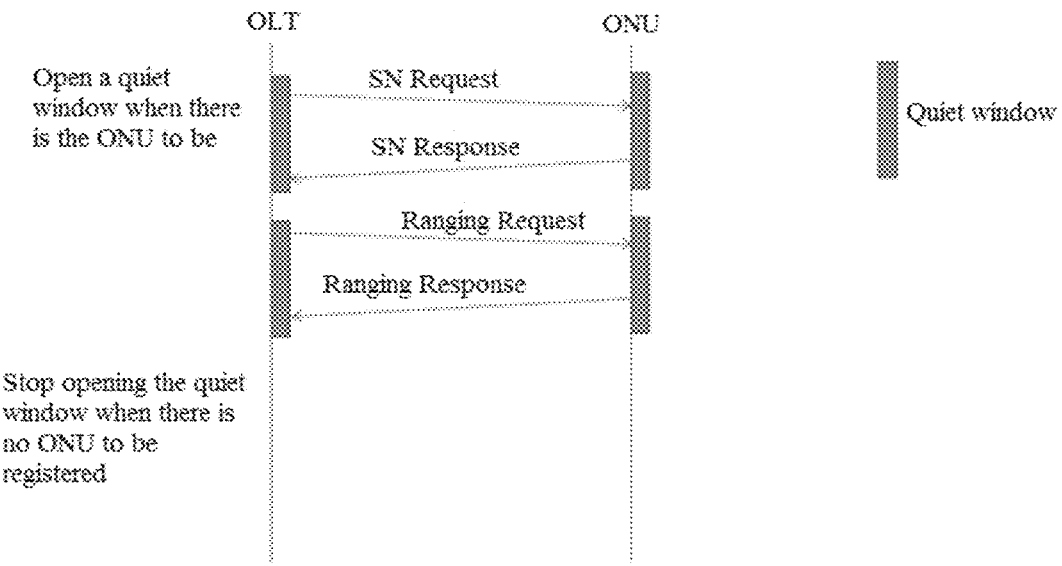
FIG. 4 is a schematic diagram of a method for opening a quiet window in an embodiment of the present application.

In the embodiments of the present application, the OLT no longer opens the quiet window periodically, but only when needed, as shown in FIG. 4, which improves the efficiency of the quiet window and reduces the impact of the quiet window on the data transmission delay. For example, the quiet window is opened only when there is an ONU needing to be registered, and opening the quiet window is stopped when there is no ONU needing to be registered.

For example, when the PON system is deployed, the registration of all the ONUs is completed. The registration process generally includes that: the OLT opens the first quiet window, an ONU reports its own identification in the first quiet window, and the OLT opens the second quiet window to conduct ranging for the ONU. During the registration process of an ONU, services are not provided for the ONU, and after all the ONUs have been registered, services are provided for the ONUs. The quiet window will not be opened periodically in the subsequent work process until needed, for example, when a new ONU is added, or when an old ONU needs to be replaced.

The addition of a new ONU is treated as a service upgrade, and service disruptions or exceptions (such as increased delay and packet loss) are allowed to achieve the addition. When a new ONU needs to be added, the OLT begins to open the first quiet window periodically, and after the new ONU is registered, the OLT stops opening the first quiet window.

Figure 5:
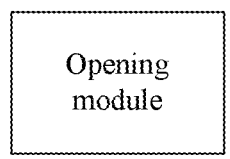
FIG. 5 is a structural schematic diagram of an apparatus for opening a quiet window provided in another embodiment of the present application.

Referring to FIG. 5, another embodiment of the present application provides an apparatus (e.g. an OLT) for opening a quiet window, which includes an opening module.

The opening module is configured to open, when it is determined that a first quiet window needs to be opened, the first quiet window.

Herein, the first quiet window is used for ONU discovery.

In the embodiments of the present application, the opening module is configured to:

when it is determined that the first quiet window needs to be opened, open the first quiet window periodically.

In the embodiments of the present application, the opening module is configured to use any of the following methods to determine that the first quiet window needs to be opened:

it is determined that there is an ONU needing to be registered; and according to first notification information, it is determined that the first quiet window needs to be opened.

In the embodiments of the present application, the opening module is configured to use any of the following methods to determine that there is an ONU needing to be registered:

according to a pre-configured amount of ONUs to be registered, it is determined that there is the ONU needing to be registered;

according to pre-configured identity information of ONUs to be registered, it is determined that there is the ONU needing to be registered; and according to second notification information, it is determined that there is the ONU needing to be registered.

In another embodiment of the present application, the opening module is further configured to:

when it is determined that the first quiet window does not need to be opened, stop opening the first quiet window.

In the embodiments of the present application, the opening module is configured to use any of the following methods to determine that the first quiet window does not need to be opened:

it is determined that registration for all ONUs to be registered has been completed; and according to third notification information, it is determined that the first quiet window does not need to be opened.

In the embodiments of the present application, the opening module is configured to use any of the following methods to determine that the registration for all the ONUs to be registered has been completed:

according to a pre-configured amount of ONUs to be registered, it is determined that the registration for all the ONUs to be registered has been completed;

according to pre-configured identity information of the ONUs to be registered, it is determined that the registration for all the ONUs to be registered has been completed;

when there is no ONU registered within a preset time, it is determined that the registration for all the ONUs to be registered has been completed; and according to fourth notification information, it is determined that registration for all the ONUs to be registered has been completed.

In another embodiment of the present application, the opening module is further configured to:

when it is determined that the second quiet window needs to be opened, open the second quiet window.

Herein, the second quiet window is used for ONU ranging, and the second quiet window is shorter than the first quiet window.

Another embodiment of the present application provides an apparatus for opening a quiet window, which includes a processor and a computer-readable storage medium. The computer-readable storage medium stores an instruction. When executed by the processor, the instruction implements any above method for opening a quiet window.

Another embodiment of the present application provides a computer-readable storage medium, which stores a computer program. When executed by a processor, the computer program implements operations of any above method for opening a quiet window.

Figure 6:
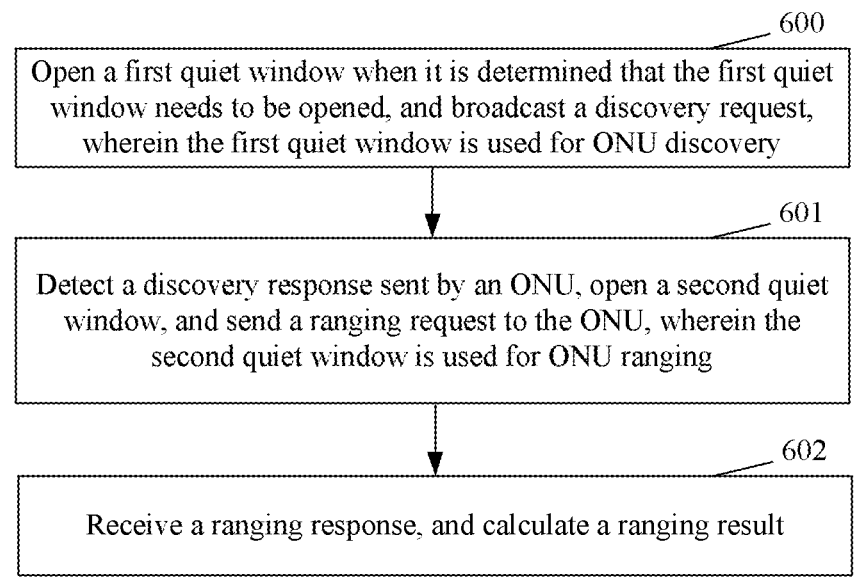
FIG. 6 is a flowchart of a registration method provided in another embodiment of the present application.

Referring to FIG. 6, another embodiment of the present application provides a registration method, which includes the following operation.

In operation 600, when it is determined that a first quiet window needs to be opened, the first quiet window is opened and a discovery request is broadcast. Herein, the first quiet window is used for ONU discovery.

In the embodiments of the present application, the first quiet window may be opened periodically.

In the embodiments of the present application, any of the following methods (including a first method and a second method) may be used to determine that the first quiet window needs to be opened.

In the first method, it is determined that there is an ONU needing to be registered.

In some embodiments, any of the following methods (1) to (3) may be used to determine that there is an ONU needing to be registered.

(1) According to a pre-configured amount of ONUs to be registered, it is determined that there is an ONU needing to be registered. For example, when the number of the registered ONUs is less than the pre-configured amount of the ONUs to be registered, or when the pre-configured amount of the ONUs to be registered is greater than or equal to 1, it is determined that there is an ONU needing to be registered.

(2) According to pre-configured identity information of ONUs to be registered, it is determined that there is an ONU needing to be registered. For example, when there is an unregistered ONU in the ONUs corresponding to the pre-configured identity information, or there is the pre-configured identity information, it is determined that there is the ONU needing to be registered.

(3) According to second notification information, it is determined that there is an ONU needing to be registered. That is, if the second notification information is received, it is determined that there is an ONU needing to be registered. The second notification information may be sent from a network management system.

In the second method, according to first notification information, it is determined that the first quiet window needs to be opened. That is, if the first notification information is received, it is determined that the first quiet window needs to be opened. The first notification information may be sent from a network management system.

In the embodiments of the present application, the discovery request in the International Telecommunication Union (ITU) is Serial Number (SN) request bandwidth allocation, and the discovery request in the Institute of Electrical and Electronics Engineers (IEEE) is a registration request message.

In the embodiments of the present application, an ONU to be registered monitors a discovery request, and sends its own identity information (i.e., the identity information of the ONU) to the OLT when the discovery request is monitored.

In operation 601, a discovery response sent by an ONU is detected, a second quiet window is opened, and a ranging request is sent to the ONU. Herein, the second quiet window is used for ONU ranging.

In the embodiments of the present application, the discovery response includes the identity information.

In the embodiments of the present application, when the second quiet window is shorter than the first quiet window, the impact of the second quiet window on the data transmission delay is reduced, thus reducing the transmission delay of the PON system.

For example, the second quiet window centers on an estimated time of arrival of the ranging response.

In the embodiments of the present application, the identity information in the ITU is the SN, and the identity information in the IEEE is a Media Access Control (MAC) address.

In the embodiments of the present application, the ranging request in the ITU is a message indicating ranging bandwidth allocation, and the ranging request in the IEEE is a ranging request message.

In the embodiments of the present application, the ONU monitors a ranging request, and returns a ranging response to the OLT when the ranging request is monitored.

In operation 602, a ranging response is received, and a ranging result is calculated.

In the embodiments of the present application, the ranging responses in both the ITU and the IEEE are ranging response messages.

In the embodiments of the present application, the ranging result may be used locally or sent to the ONU.

In another embodiment of the present application, the method may further include that:

opening the first quiet window is stopped when it is determined that the first quiet window does not need to be opened.

In the embodiments of the present application, any of the following methods (including a first method and a second method) may be used to determine that the first quiet window does not need to be opened.

In the first method, it is determined that registration for all the ONUs to be registered has been completed.

In some embodiments, any of the following methods (1) to (4) may be used to determine that registration for all the ONUs to be registered has been completed.

(1) According to a pre-configured amount of ONUs to be registered, it is determined that the registration for all the ONUs to be registered has been completed. For example, when the number of the registered ONUs is equal to the pre-configured amount of the ONUs to be registered, or when the number of the ONUs to be registered is 0, it is determined that the registration for all the ONUs to be registered has been completed.

(2) According to pre-configured identity information of ONUs to be registered, it is determined that the registration for all the ONUs to be registered has been completed. For example, when all the ONUs corresponding to the pre-configured identity information of the ONUs to be registered have been registered, or when there is no pre-configured identity information of the ONUs to be registered, it is determined that registration for all the ONUs to be registered has been completed.

(3) When there is no ONU registered within a preset time, it is determined that the registration for all the ONUs to be registered has been completed.

(4) According to fourth notification information, it is determined that the registration for all the ONUs to be registered has been completed. That is, if the fourth notification information is received, it is determined that registration for all the ONUs to be registered has been completed. The fourth notification information may be sent from a network management system.

In the second method, according to third notification information, it is determined that the first quiet window does not need to be opened. That is, if the third notification information is received, it is determined that the first quiet window does not need to be opened. The third notification information may be sent from a network management system.

In another embodiment of the present application, the method may further include the following operations.

A bandwidth is allocated for the ONU.

Any of the followings is stored:

a corresponding relationship among identity information in a discovery response, a ranging result and an allocated bandwidth;

a corresponding relationship between the identity information and the ranging result; and a corresponding relationship between the identity information and the allocated bandwidth.

In the embodiments of the present application, when all the ONUs to be registered under the OLT have been registered, a bandwidth may be allocated to the registered ONU, and the registered ONU enters a normal working state.

In another embodiment of the present application, the method may further include that:

the corresponding relationship is sent by broadcast, or the corresponding relationship is sent to the ONU with specified identity information; and information sent by the ONU at the allocated bandwidth is received.

The ONU needing to be registered monitors the corresponding relationship sent by the OLT, and obtains the corresponding relationship if its own identity information (i.e., the identity information of this ONU, also referred to as local identity information) is the same as the identity information in the corresponding relationship. The ONU obtains the ranging result and applies the ranging result locally, for example, the ONU sends data with a delay corresponding to the ranging result. The ONU obtains a bandwidth (including start time of sending+end time of sending, or time duration), and sends information to the OLT in the bandwidth. The information sent by the ONU to the OLT may be the identity information of the ONU, data sent by the ONU, or other information.

In the embodiments of the present application, the sequence of broadcasting the information in the corresponding relationship is not limited. For example, when the corresponding relationship is sent, the identity information in the corresponding relationship may be sent first, then the ranging result in the corresponding relationship is sent, and finally the bandwidth in the corresponding relationship is sent. Alternatively, the identity information in the corresponding relationship may be sent first, then the bandwidth in the corresponding relationship is sent, and finally the ranging result in the corresponding relationship is sent. Alternatively, the identity information, the ranging result and the bandwidth in the corresponding relationship are sent at the same time.

In the embodiments of the present application, the corresponding relationship may be sent by broadcast or sent to the ONU with specified identity information until information, such as the identity information of the ONU, the data sent by the ONU or the information sent by other ONUs, is received in the upstream bandwidth allocated by the OLT. Alternatively, the corresponding relationship is sent by broadcast or sent to the ONU with specified identity information when any of the followings is satisfied:

it is detected that the ONU is off-line; and configuration information of the ONU is received.

In the embodiments of the present application, for the ONU connected to an unchanged branch optical fiber of an Optical Distribution Network (ODN) between the OLT and the ONU, because when the branch optical fiber of the ODN is not changed, the distance between the ONU and the OLT connected to the branch optical fiber of the ODN remains unchanged, there is no need to re-register, thus reducing the unnecessary opening of the quiet window. Once the ONU is registered, the OLT stores the corresponding relationship, and continuously sends the corresponding relationship in a downstream direction after the ONU goes off-line. When the off-line ONU needs to go on-line again and obtains its own corresponding relationship sent by the OLT, the ONU completes the registration directly without having to be registered through opening the quiet window by the OLT.

For example, when an old ONU needs to be replaced with a new ONU, the OLT stores the corresponding relationship among the ranging result, identity information (e.g. the SN or MAC address of the old ONU) and allocated bandwidth of the ONU. The OLT broadcasts continuously the corresponding relationship until the OLT receives the information sent by the corresponding ONU at a corresponding allocated bandwidth.

Figure 7:
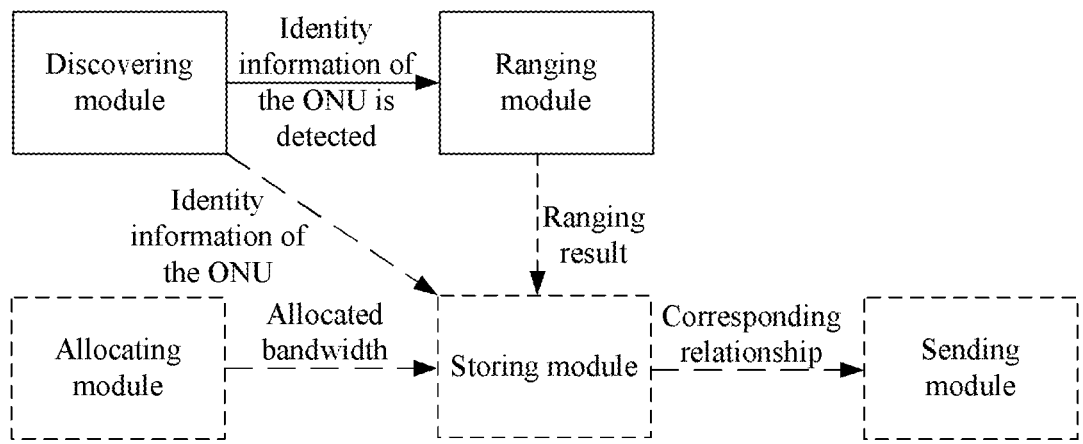
FIG. 7 is a structural schematic diagram of a registration apparatus provided in another embodiment of the present application.

Referring to FIG. 7, another embodiment of the present application provides a registration apparatus (e.g. the OLT), which includes a discovering module and a ranging module.

The discovering module is configured to, when it is determined that a first quiet window needs to be opened, open the first quiet window, broadcast a discovery request, and detect identity information sent by an ONU. Herein, the first quiet window is used for ONU discovery.

The ranging module is configured to open a second quiet window, send a ranging request to the ONU, and calculate a ranging result after receiving the ranging response. Herein, the second quiet window is used for ONU ranging.

In another embodiment of the present application, the discovering module is further configured to:
 when it is determined that the first quiet window does not need to be opened, stop opening the first quiet window.

In the embodiments of the present application, the second quiet window is shorter than the first quiet window.

In another embodiment of the present application, the registration apparatus may further include an allocating module and a storing module.

The allocating module is configured to allocate a bandwidth for the ONU.

The storing module is configured to store any of the followings:
 a corresponding relationship among identity information in the discovery response, the ranging result and the allocated bandwidth;
 a corresponding relationship between the identity information and the ranging result; and
 a corresponding relationship between the identity information and the allocated bandwidth.

In another embodiment of the present application, the registration apparatus may further include a sending module.

The sending module is configured to send the corresponding relationship by broadcast, or send the corresponding relationship to the ONU.

The information sent by the ONU at the allocated bandwidth is received.

In the embodiments of the present application, the sending module is configured to send the corresponding relationship when at least one of the followings is satisfied:
 it is detected that the ONU is off-line; and
 the configuration information of the ONU is received.

Another embodiment of the present application provides a registration apparatus, which includes a processor and a computer-readable storage medium. The computer-readable storage medium stores an instruction. When executed by the processor, the instruction implements any above registration method.

Another embodiment of the present application provides a computer-readable storage medium, which stores a computer program. When executed by a processor, the computer program implements the operations of any above registration method.

Figure 8:
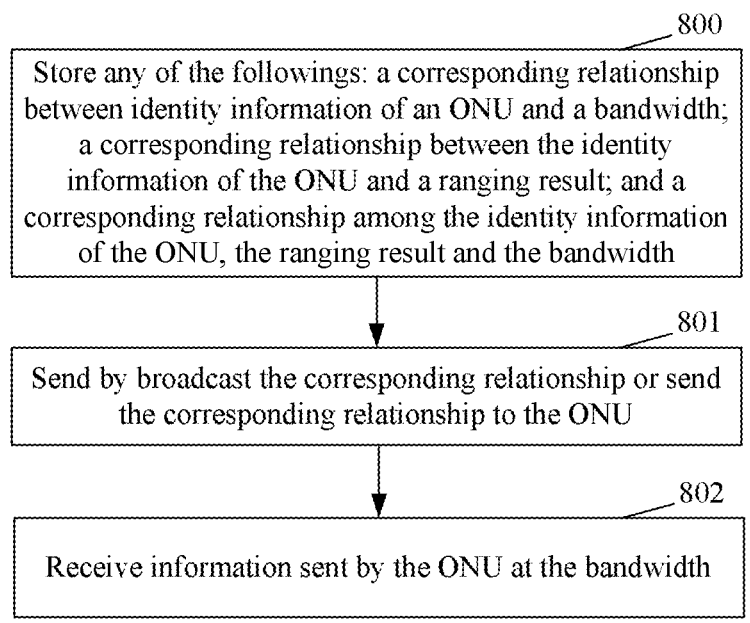
FIG. 8 is a flowchart of a registration method provided in another embodiment of the present application.

Referring to FIG. 8, another embodiment of the present application provides a registration method, which includes the following operations.

In operation 800, any of the followings is stored:
 a corresponding relationship between identity information of an ONU and a bandwidth; a corresponding relationship between the identity information of the ONU and a ranging result; and a corresponding relationship among the identity information of the ONU, the ranging result and the bandwidth.

In operation 801, the corresponding relationship is sent by broadcast or sent to the ONU.

In the embodiments of the present application, the sequence of sending the information in the corresponding relationship is not limited. For example, when the corresponding relationship is sent, the identity information in the corresponding relationship may be sent first, then the ranging result in the corresponding relationship is sent, and finally the bandwidth in the corresponding relationship is sent. Alternatively, the identity information in the corresponding relationship may be sent first, then the bandwidth in the corresponding relationship is sent, and finally the ranging result in the corresponding relationship is sent. Alternatively, the identity information, the ranging result and the bandwidth in the corresponding relationship are sent at the same time.

The corresponding relationship may be sent until information, such as the identity information of the ONU, the data sent by the ONU or the information sent by other ONUs, is received in the upstream bandwidth allocated by the OLT. Alternatively, the corresponding relationship is sent when any of the followings is satisfied:
 it is detected that the ONU is off-line; and
 the configuration information of the ONU is received.

In another embodiment of the present application, the method may further include an operation 802.

In operation 802, the information sent by the ONU at the allocated bandwidth is received.

In another embodiment of the present application, the method may further include the following operations.

A second quiet window is opened, and a ranging request is sent to the ONU. Herein, the second quiet window is used for ONU ranging.

After a ranging response is received, the ranging result is calculated.

Figure 9:
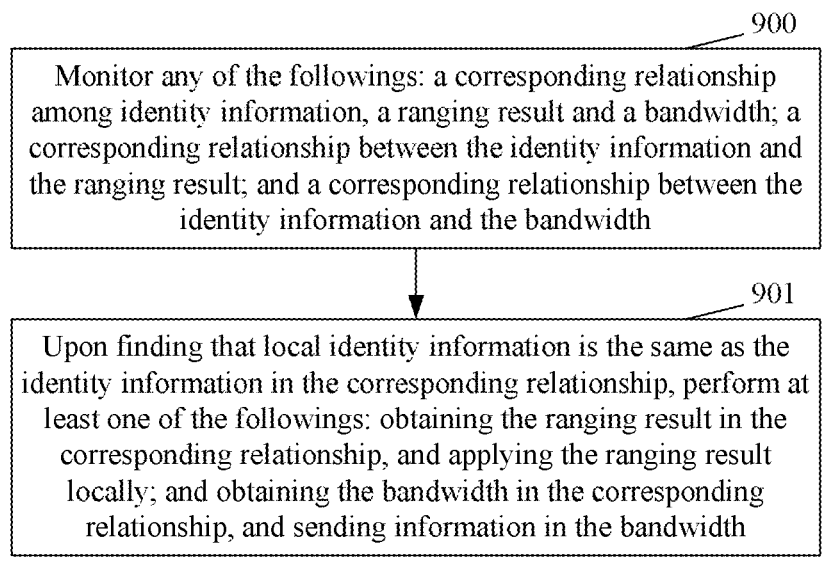
FIG. 9 is a flowchart of a registration method provided in another embodiment of the present application.

Referring to FIG. 9, another embodiment of the present application provides a registration method, which includes the following operations.

In operation 900, any of the followings is monitored: a corresponding relationship among identity information, a ranging result and a bandwidth; a corresponding relationship between the identity information and the ranging result; and a corresponding relationship between the identity information and the bandwidth.

In operation 901, upon finding that local identity information is the same as the identity information in the corresponding relationship, at least one of the followings is performed:

obtaining the ranging result in the corresponding relationship, and applying the ranging result locally; and obtaining the bandwidth in the corresponding relationship, and sending information in the bandwidth.

Figure 10:
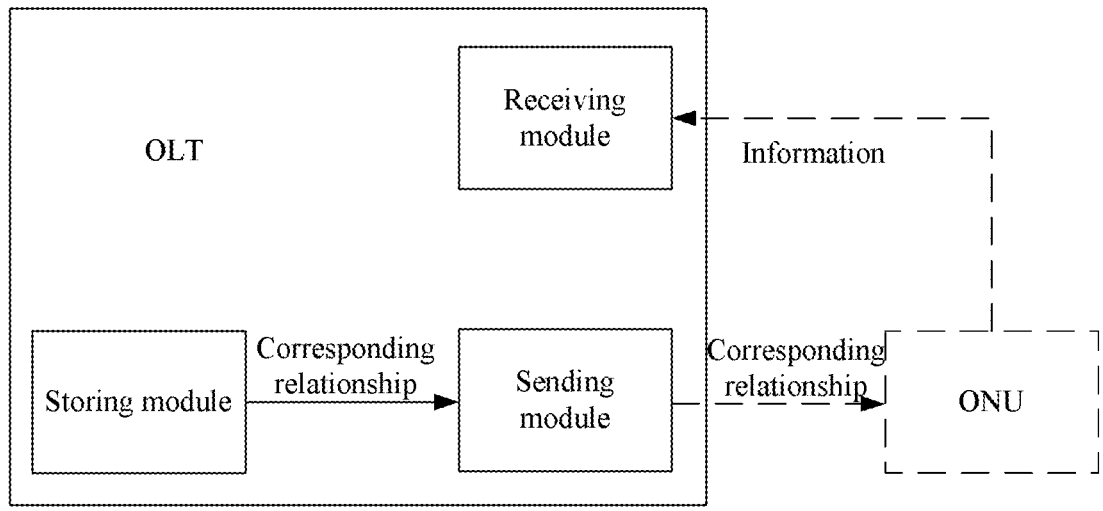
FIG. 10 is a structural schematic diagram of a registration apparatus provided in another embodiment of the present application.

Referring to FIG. 10, another embodiment of the present application provides a registration apparatus (e.g. the OLT), which includes a storing module and a sending module.

The storing module is configured to store any of the followings: a corresponding relationship between identity information of an ONU and a bandwidth; a corresponding relationship between the identity information of the ONU and a ranging result; and a corresponding relationship among the identity information of the ONU, the ranging result and the bandwidth.

The sending module is configured to send the corresponding relationship by broadcast, or send the corresponding relationship to the ONU.

In another embodiment of the present application, the registration apparatus may further include a receiving module.

The receiving module is configured to receive information sent by the ONU at the bandwidth.

The sending module is configured to send the corresponding relationship when at least one of the followings is satisfied:

it is detected that the ONU is off-line; and the configuration information of the ONU is received.

In another embodiment of the present application, the receiving module is further configured to:

open a second quiet window, and send a ranging request to the ONU, wherein the second quiet window is used for ONU ranging; and receive a ranging response, and calculate the ranging result.

The corresponding relationship may further include the ranging result.

Figure 11:
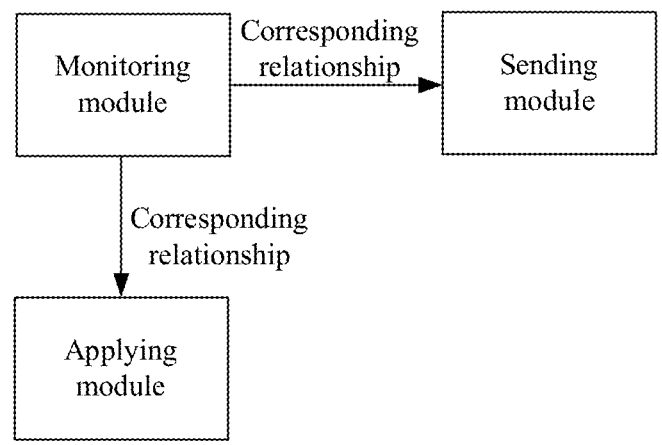
FIG. 11 is a structural schematic diagram of a registration apparatus provided in another embodiment of the present application.

Referring to FIG. 11, another embodiment of the present application provides a registration apparatus (e.g. the ONU), which includes a monitoring module and at least one of the followings: an applying module and a sending module.

The monitoring module is configured to monitor any of the followings: a corresponding relationship among identity information, a ranging result and a bandwidth; a corresponding relationship between the identity information and the ranging result; and a corresponding relationship between the identity information and the bandwidth.

The applying module is configured to locally apply the ranging result in the corresponding relationship upon finding that local identity information is the same as the identity information in the corresponding relationship.

The sending module is configured to send information in the bandwidth in the corresponding relationship upon finding that local identity information is the same as the identity information in the corresponding relationship.

Another embodiment of the present application provides a registration apparatus, which includes a processor and a computer-readable storage medium. The computer-readable storage medium stores an instruction. When executed by the processor, the instruction implements any above registration method.

Another embodiment of the present application provides a computer-readable storage medium, which stores a computer program. When executed by a processor, the computer program implements the operations of any above registration method.

Figure 12:
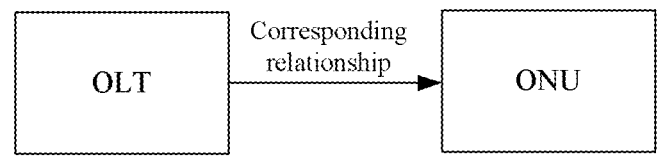
FIG. 12 is a structural schematic diagram of a registration system provided in another embodiment of the present application.

Referring to FIG. 12, another embodiment of the present application provides a registration system, which includes an OLT and an ONU.

The OLT is configured to store any of the followings: a corresponding relationship among identity information, a ranging result and a bandwidth; a corresponding relationship between the identity information and the ranging result; and a corresponding relationship between the identity information and the bandwidth.

The ONU is configured to monitor any of the followings: the corresponding relationship among the identity information, the ranging result and the bandwidth; the corresponding relationship between the identity information and the ranging result; and the corresponding relationship between the identity information and the bandwidth.

Upon finding that local identity information is the same as the identity information in the corresponding relationship, at least one of the followings is performed:

obtaining the ranging result in the corresponding relationship, and applying the ranging result locally; and obtaining the bandwidth in the corresponding relationship, and sending information in the bandwidth.

The exemplary implementation mode of the embodiments of the present application is elaborated below through specific examples.

Example 1

When the PON system is initially deployed or the ODN changes significantly, during initial operation of the OLT, the OLT allows a first quiet window to be opened so that all ONUs can be registered, and then stops opening the first quiet window and allocates bandwidths to the registered ONUs, and the registered ONUs enter a normal working state.

The registration process of the ONU includes the following operations.

1. The OLT opens the first quiet window, and sends by broadcast a discovery request in the downstream direction.

The discovery request in the ITU is the SN request bandwidth allocation, and the discovery request in the IEEE is a discovery request message.

2. The ONU to be registered monitors a discovery request, and sends its own identity information to the OLT when the discovery request is monitored.

The identity information in the ITU is the SN, and the identity information in the IEEE is the MAC address.

3. The OLT detects a discovery response, which includes the identity information, sent by the ONU, opens a second quiet window, and sends a ranging request to the ONU corresponding to the identity information.

The ranging request in the ITU is the ranging bandwidth allocation, and the ranging request in the IEEE is the ranging request message.

4. The ONU monitors the ranging request, and returns a ranging response to the OLT when the ranging request is monitored.

The ranging responses in both the ITU and the IEEE are the ranging response messages.

5. After receiving the ranging response, the OLT calculates a ranging result, and applies the ranging result locally or sends the ranging result to the ONU.

6. When all the ONUs to be registered under the OLT have been registered, the OLT stops opening the first quiet window, and allocates the bandwidths to the registered ONUs, and the registered ONUs enter the normal working state.

The OLT is informed that the registration for all the ONUs to be registered has been completed in (but not limited to) any of the following ways:

(1) the number of the ONUs to be registered is pre-configured, and when the number of the registered ONUs reaches the number of the ONUs to be registered, it is considered that the registration for all the ONUs to be registered has been completed;

(2) an identity information base of the ONUs to be registered is pre-configured, and when all the ONUs in the identity information base have been registered, it is considered that the registration for all the ONUs to be registered has been completed;

(3) if there is no ONU continuing to register within a specified time, it is considered that the registration for all the ONUs to be registered has been completed;

(4) a network management system informs the OLT that the registration for all the ONUs to be registered has been completed; and (5) the network management system makes the OLT stop opening the first quiet window.

Example 2

When there is a new ONU to be registered, the OLT begins to open a first quiet window periodically, and after the new ONU is registered, the OLT stops opening the first quiet window. During the process, service interruptions or exceptions (such as increased delay and packet loss) are allowed.

When there is a new ONU to be registered, the process includes the following operations.

1. When learning that there is a new ONU to be registered, the OLT opens the first quiet window, and sends by broadcast a discovery request in the downstream direction.

2. The ONU to be registered monitors the discovery request, and sends its own identity information to the OLT when the discovery request is monitored.

3. The OLT detects the discovery response, which includes the identity information, sent by the ONU, opens a second quiet window, and sends a ranging request to the ONU corresponding to the identity information.

4. The ONU monitors the ranging request, and returns a ranging response to the OLT when the ranging request is monitored.

5. After receiving the ranging response, the OLT calculates a ranging result, and applies the ranging result locally or sends the ranging result to the ONU.

6. When all the new ONUs have been registered, the OLT stops opening the first quiet window, and allocates the bandwidths to the registered ONUs, and the registered ONUs enter the normal working state.

The OLT is informed that there is a new ONU to be registered in (but not limited to) any of the following ways:

(1) when the number of the ONUs to be registered is pre-configured, it is considered that there is a new ONU to be registered;

(2) when a identity information base of the ONUs to be registered is pre-configured, it is considered that there is a new ONU to be registered; and (3) a network management system makes the OLT allow the first quiet window to be opened.

As having been described in Example 1, the OLT is informed that the registration for all the ONUs to be registered has been completed in (but not limited to) any of the following ways:

(1) the number of the ONUs to be registered is pre-configured, and when the number of the registered ONUs reaches the number of the ONUs to be registered, it is considered that registration for all the ONUs to be registered has been completed;

(2) a identity information base of the ONUs to be registered is pre-configured, and when all the ONUs in the base have been registered, it is considered that registration for all the ONUs to be registered has been completed;

(3) if there is no ONU continuing to register within a specified time, it is considered that registration for all the ONUs to be registered has been completed;

(4) a network management system informs the OLT that registration for all the ONUs to be registered has been completed; and (5) the network management system makes the OLT stop opening the first quiet window.

Example 3

When the PON system is initially deployed or the ODN changes significantly, during initial operation of the OLT, the OLT allows a first quiet window to be opened so that all ONUs can be registered, and then stops opening the first quiet window and allocates bandwidths to the registered ONUs, and the registered ONUs enter the normal working state.

The registration process of the ONU includes the following operations.

1. The OLT opens the first quiet window, and sends by broadcast a discovery request in the downstream direction.

2. The ONU to be registered monitors the discovery request, and sends its own identity information to the OLT when the discovery request is monitored.

3. The OLT detects a discovery response, which includes the identity information, sent by the ONU, opens a second quiet window, and sends a ranging request to the ONU corresponding to the identity information.

4. The ONU monitors the ranging request, and returns a ranging response to the OLT when the ranging request is monitored.

5. After receiving the ranging response, the OLT calculates a ranging result, and applies the ranging result locally or sends the ranging result to the ONU.

6. When all the ONUs to be registered under the OLT have been registered, the OLT stops opening the first quiet window, and allocates the bandwidths to the registered ONUs, and the registered ONUs enter the normal working state.

The OLT is informed that the registration for all the ONUs to be registered has been completed in (but not limited to) any of the following ways:

(1) the number of the ONUs to be registered is pre-configured, and when the number of the registered ONUs reaches the number of the ONUs to be registered, it is considered that registration for all the ONUs to be registered has been completed;

(2) a identity information base of the ONUs to be registered is pre-configured, and when all the ONUs in the base have been registered, it is considered that registration for all the ONUs to be registered has been completed;

(3) if there is no ONU continuing to register within the specified time, it is considered that registration for all the ONUs to be registered has been completed;

(4) a network management system informs the OLT that registration for all the ONUs to be registered has been completed; and (5) the network management system makes the OLT stop opening the first quiet window.

The OLT stores the corresponding relationship among the ranging result, the identity information (e.g. the SN or the MAC address or the identity information of the old ONU) and the allocated bandwidth of each registered ONU according to the identity information.

The OLT may continuously broadcast the corresponding relationship of the registered ONU. Alternatively, the OLT may broadcast the corresponding relationship of the registered ONU only when needed. For example, the OLT broadcasts the corresponding relationship when finding that the ONU goes off-line. For another example, a network management system configures that the OLT broadcasts the corresponding relationship, that is, the network management system sends configuration information to the OLT, and the OLT broadcasts the corresponding relationship after receiving the configuration information.

For example, when it is necessary to replace an old ONU with a new ONU, the new ONU still uses an identity of the old ONU, the OLT continuously broadcasts the identity, the ranging result (eqd) and the allocated bandwidth until the OLT receives in the corresponding allocated bandwidth the information sent by the corresponding ONU, and in this way the new ONU is registered.

For another example, when the ONU re-registers after repair, the ONU still uses its original identity information, and the OLT continuously broadcasts the corresponding relationship among the identity information, the ranging result (eqd) and the allocated bandwidth until the OLT receives at the allocated bandwidth the information sent by the corresponding ONU, and in this way the new ONU is registered.

For another example, when the branch optical fiber connected to the ONU is not changed, the ONU still uses its original identity information, and the OLT continuously broadcasts the corresponding relationship among the identity information, the ranging result (eqd) and the allocated bandwidth until the OLT receives at the allocated bandwidth the information sent by the corresponding ONU, and in this way the new ONU is registered.

For another example, when the branch optical fiber connected to the ONU is changed, the ONU still uses its original identity information, and the OLT continuously broadcasts the corresponding relationship among the identity information, the ranging result (eqd) and the allocated bandwidth until the OLT receives at the allocated bandwidth the information sent by the corresponding ONU. Since the distance between the ONU and the OLT changes, it is necessary to re-conduct ONU ranging. The OLT opens a second quiet window and sends a ranging request to the ONU. The ONU monitors the ranging request, and returns a ranging response to the OLT after monitoring the ranging request. After receiving the ranging response, the OLT calculates a ranging result, and applies the ranging result locally or sends the ranging result to the ONU. In this way, the ONU is registered.

Those of ordinary skill in the art may understand that all or some of the operations in the above method disclosed, the system, the functional modules/units in the apparatus may be implemented as software, firmware, hardware and a proper combination of them. In an implementation of hardware, the division of the functional modules/units mentioned in the above description does not necessarily correspond to the division of physical units. For example, a physical component may have multiple functions, or a function or operation may be performed by several physical components in coordination. Some or all of the components may be implemented as software performed by a processor, for example, a digital signal processor or a microprocessor, or implemented as hardware, or implemented as an integrated circuit, for example, an application-specific integrated circuit. Such software may be distributed on computer readable medium. The computer readable medium may include computer storage medium (or non-transitory medium) and communication medium (or transitory medium). As those of ordinary skill in the art know, the term computer storage medium include volatile and non-volatile medium, and removable and un-removable medium which are implemented in any method or technology for storing information (such as a computer readable instruction, a data structure, a program module or other data). The computer storage medium includes, but is not limited to, an RAM, an ROM, an EEPROM, a flash memory or other memory technologies, a CD-ROM, a Digital Video Disk (DVD) or other optical storage, a cartridge, a tape, a disk storage or other magnetic storage apparatuses, or any other medium which may be used for storing expected information and may be accessed by a computer. Moreover, as those of ordinary skill in the art know, the communication medium generally include the computer readable instruction, the data structure, the program module or other data, such as carriers or other transmission mechanisms, in a modulation data signal, and may include any information delivery medium.

Although the implementations disclosed by the embodiments of the present application of the application are as above, the contents are only adopted for facilitating understanding, but not intended to limit, the embodiments of the present application. Any skilled in the art of the embodiments of the present application may make any modification and change on implementation forms and details without departing from the scope disclosed by the embodiments of the present application, but the protection scope of the embodiments of the present application is still subject to the scope limited by the claims attached.

What is claimed is:

1. A method for opening a quiet window, comprising:
when determining that a first quiet window needs to be opened, opening the first quiet window,
wherein the first quiet window is used for Optical Network Unit (ONU) discovery, determining that the first quiet window needs to be opened comprises: when a Passive Optical Network (PON) system is deployed, a new ONU is added, or an old ONU needs to be replaced, determining that there is an ONU needing to be registered;
when determining that the first quiet window does not need to be opened, stopping opening the first quiet window, wherein determining that the first quiet window does not need to be opened comprises: determining that registration for all ONUs to be registered has been completed.

2. The method as claimed in claim 1, wherein opening the first quiet window comprises:
periodically opening the first quiet window.

3. The method as claimed in claim 1, wherein determining that the first quiet window needs to be opened further comprises:
determining, according to first notification information, that the first quiet window needs to be opened.

4. The method as claimed in claim 1, wherein determining that there is an ONU needing to be registered comprises any of the followings:
   determining, according to a pre-configured amount of ONUs to be registered, that there is the ONU needing to be registered;
   determining, according to pre-configured identity information of ONUs to be registered, that there is the ONU needing to be registered; and
   determining, according to second notification information, that there is the ONU needing to be registered.

5. The method as claimed in claim 1, wherein determining that the first quiet window does not need to be opened further comprises:
   determining, according to third notification information, that the first quiet window does not need to be opened.

6. The method as claimed in claim 1, wherein determining that registration for all ONUs to be registered has been completed comprises any of the followings:
   determining, according to a pre-configured amount of the ONUs to be registered, that the registration for all the ONUs to be registered has been completed;
   determining, according to pre-configured identity information of the ONUs to be registered, that the registration for all the ONUs to be registered has been completed;
   determining that there is no ONU registered within a preset time; and
   determining, according to fourth notification information, that the registration for all the ONUs to be registered has been completed.

7. The method as claimed in claim 1, further comprising:
   when determining that a second quiet window needs to be opened, opening the second quiet window;
   wherein the second quiet window is used for Ranging of the ONU, and the second quiet window is shorter than the first quiet window.

8. The method as claimed in claim 1, further comprising:
   when determining that the first quiet window needs to be opened, broadcasting a discovery request;
   detecting a discovery response sent by an ONU, opening a second quiet window, and sending a ranging request to the ONU, wherein the second quiet window is used for ONU ranging; and
   receiving a ranging response, and calculating a ranging result.

9. The method as claimed in claim 8, further comprising:
   storing any of the followings:
   a corresponding relationship among identity information in the discovery response, the ranging result and an allocated bandwidth;
   a corresponding relationship between the identity information and the ranging result; and
   a corresponding relationship between the identity information and the allocated bandwidth.

10. The method as claimed in claim 9, further comprising:
    sending the corresponding relationship by broadcast, or sending the corresponding relationship to the ONU; and
    receiving information sent by the ONU at the allocated bandwidth.

11. The method as claimed in claim 10, wherein sending the corresponding relationship when at least one of the followings is satisfied:
    it is detected that the ONU is off-line; and
    configuration information of the ONU is received.

12. An apparatus for opening a quiet window, comprising a processor and a computer-readable storage medium, the computer-readable storage medium storing an instruction, wherein the instruction, when being executed by the processor, implements the method for opening the quiet window as claimed in claim 1.

13. A registration method, comprising:
    storing any of the followings:
    a corresponding relationship between identity information of an Optical Network Unit (ONU) and a bandwidth; a corresponding relationship between the identity information of the ONU and a ranging result; and a corresponding relationship among the identity information of the ONU, the ranging result and the bandwidth; and
    sending the corresponding relationship by broadcast, or sending the corresponding relationship to the ONU;
    wherein sending the corresponding relationship by broadcast, or sending the corresponding relationship to the ONU comprises: when it is detected that the ONU is off-line, continuously sending the corresponding relationship in a downstream direction.

14. The registration method as claimed in claim 13, wherein sending the corresponding relationship further when
    configuration information of the ONU is received.

15. The registration method as claimed in claim 13, further comprising:
    opening a second quiet window, and sending a ranging request to the ONU, wherein the second quiet window is used for ONU ranging; and
    receiving a ranging response, and calculating the ranging result.

16. The registration method as claimed in claim 13, further comprising:
    receiving information sent by the ONU at the bandwidth.

17. A registration apparatus, comprising a processor and a computer-readable storage medium, the computer-readable storage medium storing an instruction, wherein the instruction, when being executed by the processor, implements the registration method as claimed in claim 13.

18. A registration method, comprising:
    monitoring any of the followings in a downstream direction when coming back on-line after going off-line: a corresponding relationship among identity information, a ranging result and a bandwidth; a corresponding relationship between the identity information and the ranging result; and a corresponding relationship between the identity information and the bandwidth;
    upon finding that local identity information is the same as the identity information in the corresponding relationship, performing at least one of the followings:
    obtaining the ranging result in the corresponding relationship, and applying the ranging result locally; and
    obtaining the bandwidth in the corresponding relationship, and sending information in the bandwidth.

19. A registration apparatus, comprising a processor and a computer-readable storage medium, the computer-readable storage medium storing an instruction, wherein the instruction, when being executed by the processor, implements the registration method as claimed in claim 18.

* * * * *